United States Patent [19]
Faria

[11] Patent Number: 5,640,751
[45] Date of Patent: Jun. 24, 1997

[54] VACUUM FLANGE

[75] Inventor: Carl R. Faria, San Leandro, Calif.

[73] Assignee: Thermionics Laboratories, Inc., Calif.

[21] Appl. No.: 502,958

[22] Filed: Jul. 17, 1995

[51] Int. Cl.[6] .................................................. F16L 19/00
[52] U.S. Cl. ............................ 29/525.07; 29/888.3; 29/557
[58] Field of Search ............................. 29/888.3, 557, 29/558, 525.02, 525.11; 285/917, 328; 277/167.5, 171

[56] References Cited

U.S. PATENT DOCUMENTS

| | | | |
|---|---|---|---|
| 2,255,504 | 9/1941 | Current | 29/888.3 |
| 2,926,937 | 3/1960 | Parsons | 285/350 |
| 3,208,758 | 9/1965 | Carlson et al. | 285/336 |
| 3,370,508 | 2/1968 | Iaia | 409/132 |
| 4,616,860 | 10/1986 | Faria et al. | 285/328 |
| 4,685,193 | 8/1987 | Faria et al. | 29/558 |
| 5,094,795 | 3/1992 | McMillan et al. | 285/917 |

*Primary Examiner*—Larry I. Schwartz
*Assistant Examiner*—Marc W. Butler
*Attorney, Agent, or Firm*—Linval B. Castle

[57] ABSTRACT

A high vacuum sealing flange is formed of an outer housing with an insert which has, around its periphery, a blade formed on a inward-upward slant that cooperates with the inner wall of the housing to plastically deform a soft metal gasket when it is clamped between a similar flange. While designed primarily for rectangular flanges, the claimed invention may be used to make flanges of any desired shape.

6 Claims, 2 Drawing Sheets

5,640,751

VACUUM FLANGE

SUMMARY OF THE INVENTION

This invention refers generally to high vacuum apparatus and in particular to a method of fabricating a non-circular high vacuum metal seal structure for coupling pipes and tubes in a vacuum system.

High vacuum metal sealing flanges have been manufactured in circular form for many years. U.S. Pat. No. 3,208,758, issued in 1965 for a Metal Vacuum Joint, describes a flange wherein a soft metal gasket, such as copper, forms a perfect vacuum seal when pressed between two identical flanges having blades pitched at an angle that will plastically deform the edges of the soft metal against a vertical wall at the base of the angle. That concept has proven to be valid and flanges of that design continue to be used extensively for circular vacuum flanges Circular flanges are relatively simple to manufacture on a lathe but non-circular flanges have proven to impossible without changing the structural design of the circular flange. In my U.S. Pat. No. 4,685,193, a rectangular flange was made by greatly enlarging the area at the base of the pitched blade and thus removing the narrow wall with an end mill from each half of the flange and, upon final assembly, inserting a thin spacer having a wall that replaces the removed sections.

Briefly described, the non-circular flange to be described herein is a sturdy two-piece structure that can easily be formed with a milling machine. One piece forms the outer housing of the flange and has a recessed inner walls that form the vertical walls of the seal. The second of the two-piece flange fits into the recessed inner portion of the housing and has, at the periphery of its exposed upper surface, the blade pitched at the proper angle to cooperate with the wall of the housing to form a rectangular flange. A complete vacuum tight flange assembly includes a soft metal gasket clamped between two flanges.

DESCRIPTION OF THE DRAWINGS

In the drawings which illustrate the preferred embodiment of the invention.

DETAILED DESCRIPTION

The high vacuum flange assembly of the invention is comprised of two identical flanges that are bolted together around a soft copper gasket which performs the sealing. Each flange is preferably stainless steel formed into an outer housing and an insert which together have the necessary pitched blade with vertical backing to form the necessary sealing when equipped with the soft copper gasket and mated with and bolted to an identical flange.

Figure 1:
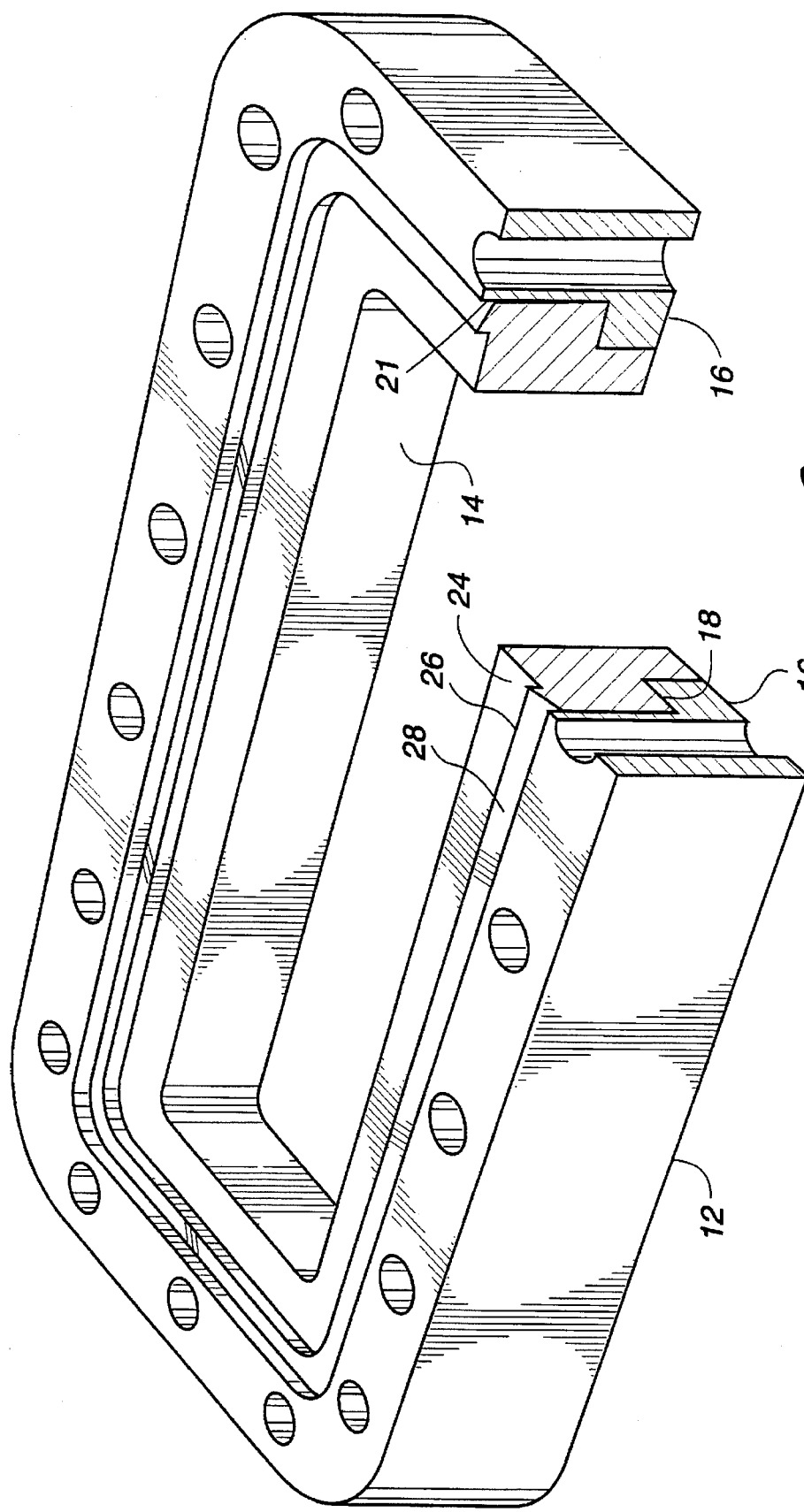
FIG. 1 is a perspective view of a rectangular flange made in accordance with the invention and is illustrated with a corner removed and in section.

FIG. 1 is a perspective view of a rectangular flange with one corner removed to illustrate, in section, the housing 12 with the insert 14. A flange made with separate housings and inserts may be made with a vertical milling machine, into a rectangular cross section, as this, or may be circular or have any desired form.

In the embodiment illustrated a stainless steel plate about one inch thick is cut into the desired rectangular outside shape to form the housing 12 and then the center part 15 is removed, leaving a rim 16 of about one inch in width with an inner wall 17 and an outer wall 19. With all corners suitably rounded from the same center point the housing will appear, at this stage, to be a one-inch square bar bent into an endless rectangular form.

The housing is now chucked on a milling machine and the inner wall 17 of the wide rim 16 is milled to some precise depth of approximately 0.6 inches, leaving a step 18 about 0.3 inches wide about 0.4 inches from the opposite surface. The depth and the width of the step 18 must be precise because they determine the size and thickness, respectively, of the insert that fits on the step 18 within the housing.

Figure 2:
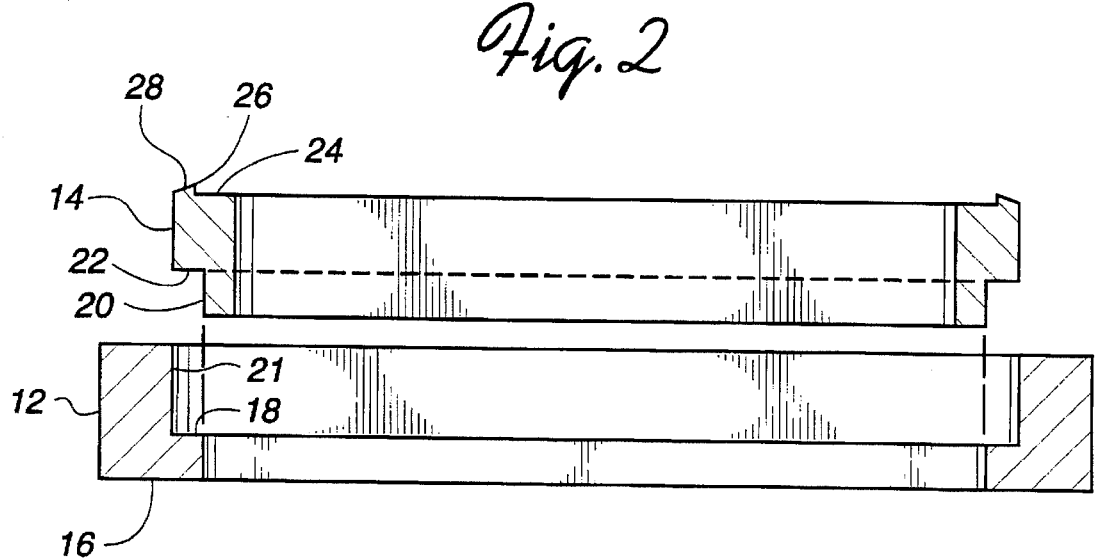
FIG. 2 is a side elevational view illustrating in section the housing and insert forming a flange.

The insert 14 may have a cut-out center and a lower part 20 shaped to fit within the areas between the wall 21 of the stepped portion and between the milled out center of the housing, as shown in FIG. 2, or may be solid for drilling and welding thereto a plurality of small pipes. The insert has outside dimensions about 0.005 inches smaller than the inside dimension of the walls 21 of the housing 12 to assure a fairly close fit between the two pieces. The thickness of the insert between its step 22 and its top surface should be 0.025 inches less than the precise depth of the step milled around the interior wall of the housing so that the exposed top surface of the insert is slightly below the upper rim of the housing when the insert rests on the step 18.

The periphery of the top surface of insert 14 is now milled with a 0.10 inch wide bevel of preferably 20° from horizontal, and the top surface within that bevel is milled to a depth of about 0.06 inches to form a new top surface 24 to provide clearance for the metal gasket and to form a blade 26 having a bevel 28 at an angle of 20°.

Referring again to FIG. 1, it can now be seen that by placing the insert 14 within the housing 12, the slanted or pitched blade 26 together with the vertical wall 21 forms a same metal sealing structure as described in the earlier patent for a circular sealing structure.

Figure 3:
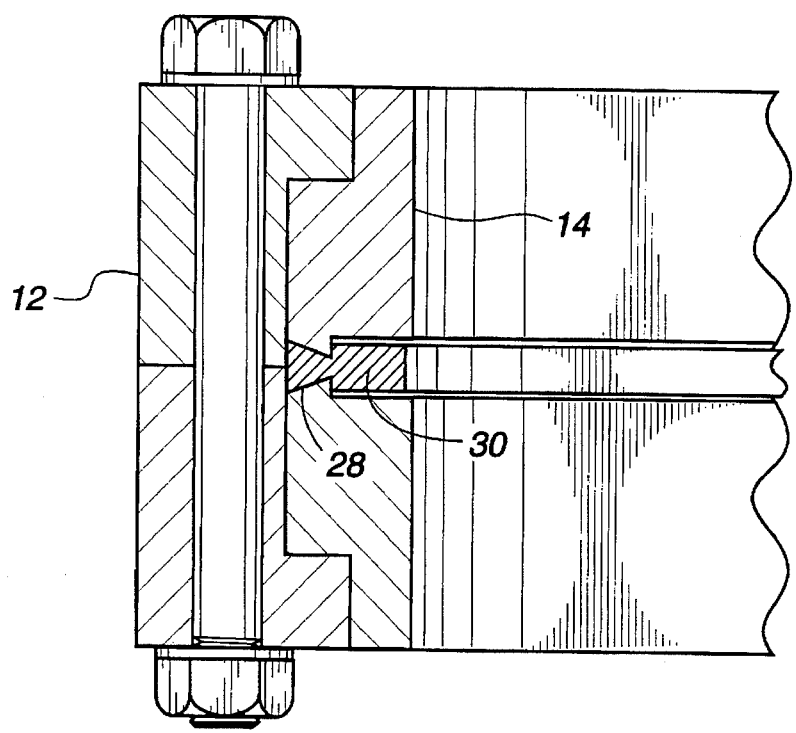
FIG. 3 is a sectional view of part of an assembly of two flanges bolted together with a soft metal gasket.

FIG. 3 shows two of the flanges described above bolted together into a vacuum flange assembly with a metal gasket 30 wedged between the pitched blades 26. In operation, the flanges are attached to a vacuum chamber or to vacuum conduit by welding or brazing the insert 14 to the chamber or conduit. Then a gasket, usually of copper, is placed between the two flanges. The gasket 30 has flat parallel side surfaces. Under pressure from the tightening of the bolts, the soft metal of the gasket is plastically deformed by the blade 26 and the bevel 28 so that its periphery is wedged into the small volume between the bevel 28 and the vertical wall 21 to provide a complete seal between the inserts of both halves. This seals against all ultra-high vacuum leakage, even under "baking" conditions which puts expansion stresses on all parts of the equipment to which the sealing structure is attached.

I claim:

1. A method for forming a vacuum-tight metal gasket flange comprising the steps of:

providing a flange outer housing having top and bottom flat parallel surfaces and inner and outer walls;

milling said inner wall to a predetermined depth at a right angle from said top surface, leaving a step between and parallel to said top and bottom surfaces;

providing an insert that fits within said milled inner wall and upon said step, said insert having flat top and bottom surfaces and a side edge with a thickness equal to approximately 0.02 inches less than said predetermined depth;

milling the top surface of said insert at said side edge into an upward-inward slanting surface; and milling the top surface of said insert to within approximately 0.01 inches of said side edge to form a blade edge on said slanting surface.

2. The method for forming a flange claimed in claim 1 further including boring bolt holes through said housing between the flange's top and bottom surfaces for securing two flanges.

3. The method for forming a flange claimed in claim 1 wherein said upward-inward slanting surface on said insert is approximately 20° from the inserts top surface.

4. The method for forming a flange claimed in claim 2 further including removing a center portion from said insert between its top and bottom surfaces.

5. The method for forming a vacuum-tight metal gasket flange claimed in claim 2 including the steps of:

providing two of said flange housings and inserts;

installing said inserts in the housings and upon said step in each of said housings;

positioning a soft metal gasket upon said blade edge and within said inner wall of one of said two flange housings;

aligning said two flange housings against each other, said blades of said inserts being aligned on opposite surfaces of said gasket; and inserting bolts in said bolt holes and tightening said bolts to plastically deform said gasket against said inner wall.

6. A method for forming a non-circular vacuum-tight metal gasket flange having two substantially identical facing sealing members, said method comprising the steps of:

providing a pair of non-circular outer housings, each of said pair having parallel inner and outer walls and flat parallel top and bottom surfaces perpendicular to said walls;

milling said inner walls of each outer housing to a predetermined depth at a right angle to said top surface to form a step between said top and bottom surfaces and parallel therewith;

providing a pair of non-circular inserts, each of said pair of inserts having flat top and bottom surfaces and sidewalls that closely fit within said inner walls of said outer housings, said top surfaces of said inserts being approximately 0.02 inches below the top surfaces of said housings when said inserts are upon the steps in said inner walls;

milling the top surface of each of said pair of inserts at their sidewalls into upward-inward slanting surfaces;

milling the top surface of each of said pair of inserts to within approximately 0.01 inch of said sidewall to form a blade edge on each slanting surface;

inserting said pair of inserts into said outer housings and upon the steps in said inner walls of said housings;

positioning a soft metal gasket upon said blade edge of one of said pair of inserts; and clamping together said pair of outer housings, said blade edges on each of said said pair of inserts plastically deforming said soft metal gasket against the inner walls of said housings.

* * * * *